US009158480B2

(12) United States Patent
Fernandes et al.

(10) Patent No.: US 9,158,480 B2
(45) Date of Patent: Oct. 13, 2015

(54) PRINTER APPLICATION STATES (75) Inventors: Lenin Fernandes, Bangalore (IN);
Venugopal Kumarahalli Srinvasmurthy, Bangalore (IN);
Vishwanath Ramaiah Nanjundaiah, Bangalore (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 324 days.

(21) Appl. No.: 13/329,478

(22) Filed: Dec. 19, 2011

(65) Prior Publication Data

US 2013/0155449 A1 Jun. 20, 2013

(51) Int. Cl.
*G06F 15/00* (2006.01)
*G06F 3/12* (2006.01)

(52) U.S. Cl.
CPC ............ *G06F 3/1204* (2013.01); *G06F 3/1208* (2013.01); *G06F 3/1256* (2013.01); *G06F 3/1271* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 6,094,276 | A * | 7/2000 | Yamaguchi et al. | 358/1.15 |
| 6,321,266 | B1 * | 11/2001 | Yokomizo et al. | 709/226 |
| 6,799,297 | B2 * | 9/2004 | Ackaret | 715/222 |
| 6,819,341 | B2 * | 11/2004 | Dow et al. | 715/772 |
| 7,050,181 | B2 | 5/2006 | Korst et al. | |
| 7,167,272 | B2 * | 1/2007 | Fredlund et al. | 358/1.2 |
| 8,264,711 | B2 * | 9/2012 | Takahashi | 358/1.15 |
| 8,271,893 | B1 * | 9/2012 | Tighe et al. | 715/765 |
| 2002/0198842 | A1 * | 12/2002 | Kurtz et al. | 705/51 |
| 2005/0114772 | A1 * | 5/2005 | Talley et al. | 715/541 |
| 2005/0289126 | A1 * | 12/2005 | Koguchi | 707/3 |
| 2007/0171436 | A1 * | 7/2007 | Manchester | 358/1.1 |
| 2008/0004075 | A1 * | 1/2008 | Horton | 455/557 |
| 2008/0052620 | A1 * | 2/2008 | Hwang | 715/272 |
| 2008/0189191 | A1 * | 8/2008 | Roche | 705/26 |
| 2008/0246988 | A1 * | 10/2008 | Ashton | 358/1.15 |
| 2009/0030889 | A1 * | 1/2009 | Chatow et al. | 707/5 |
| 2009/0135438 | A1 * | 5/2009 | Chopra et al. | 358/1.6 |

(Continued)

FOREIGN PATENT DOCUMENTS

WO   WO-2010094965 A1   8/2010

OTHER PUBLICATIONS

David Kappos, Subject Matter Eligibility of Computer Readable Media, US Patent and Trademark Office, Feb. 23, 2010, 1351 OG 212.*

(Continued)

*Primary Examiner* — Ted Barnes
(74) *Attorney, Agent, or Firm* — Hewlett-Packard Patent Department (57) ABSTRACT In one embodiment, first data is received at a computer system from a first network-connected printer. The first data includes state data describing a state of a printer application as accessed and viewable by a user at the first printer. The first data additionally includes content to be edited via the application. The first data is sent to a computing device that is configured to provide a user with access and a view to the content via the state. The computing device is additionally configured to enable a user utilizing the application to perform an editing function not available at the first printer. Edited content, that is the result of user editing of the content at the device via the application, is received from the device. The edited content is sent to a network-connected printer for printing.

19 Claims, 5 Drawing Sheets

(56) References Cited

U.S. PATENT DOCUMENTS

| | | | |
|---|---|---|---|
| 2009/0279134 A1* | 11/2009 | Fujii | 358/1.15 |
| 2010/0031350 A1* | 2/2010 | Ueda | 726/20 |
| 2011/0013225 A1* | 1/2011 | Grosz et al. | 358/1.15 |
| 2011/0063397 A1* | 3/2011 | Mindler et al. | 347/217 |
| 2011/0181902 A1* | 7/2011 | Chiba et al. | 358/1.13 |
| 2012/0026519 A1* | 2/2012 | Yoshida | 358/1.11 |
| 2012/0087537 A1* | 4/2012 | Liu et al. | 382/100 |
| 2012/0099129 A1* | 4/2012 | Ogino et al. | 358/1.13 |
| 2012/0154861 A1* | 6/2012 | Sato | 358/1.15 |
| 2012/0229832 A1* | 9/2012 | Tsujimoto | 358/1.13 |
| 2012/0320411 A1* | 12/2012 | Ganesan et al. | 358/1.15 |

OTHER PUBLICATIONS

White Paper; "ZebraLink™ Solutions for Enhancing Zebra® Printer Business Integration"; Zebra Technologies; Jul. 2010; 8 pages.

* cited by examiner

PRINTER APPLICATION STATES

BACKGROUND

Some network-connected printers are capable of sending and receiving communications and printable content via the internet, without being connected to a desktop computer, laptop computer, or other host computing device. Such printers may also provide users with an option to download and execute, or to otherwise access at the printer, printer applications that facilitate content browsing, downloading, and printing of content that is available to the printer via the internet.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Internet-connected printers provide users with great advantages and flexibility to browse, download, edit, print, and/or share internet-accessible content at printer applications accessible at the printer. Examples of such printer applications include, but are not limited to, printer applications available at Hewlett Packard Company's "HP® ePrint-Center" web site that can provide printable content relating to business, calendars, coupons, education, entertainment, family activities, greeting cards, maps, news, photos, puzzles, recipes, tickets, and travel.

However, there are circumstances in which the network-connected printer is not the optimal computing device for editing downloaded content. For example, if a particular network-connected printer has a limited display screen area, limited user interface functionality, and/or limited processing power relative to another computing device that is accessible to a user, a user may view performing certain content-editing tasks at the printer as suboptimal. For example, while a display screen at a network-connected printer may be sufficient for a majority of the tasks associated with browsing content and printing of content, that same display screen may be inadequate for certain detailed or specialized editing tasks. Examples of such detailed or specialized editing tasks that may be difficult or not available at certain printers include but are not limited to, adding a handwritten annotation or message to content, attaching personalized photos, attaching personalized voice memos, cropping, adjustment of colors, and redeye correction. On the other hand, certain other computing devices, including notebook computers and touch based devices such as a tablet computer will have higher processing power and more elaborate user interfaces than a particular printer does. The user may desire to move the content to the second device for performing the detailed or specialized editing task, but will likely view manual steps (e.g., manually via a flash drive or manually via a user initiated file transfer protocol) as time consuming and monotonous.

Further, using traditional processes, once the content has been transferred to the second computing device, it is likely that the user will be required to use a software application that is dissimilar from the printer application that the user was interacting with at the printer. This can be a negative experience for the user. And even if the application at the second computing device that will be used to edit the content has the same general look and feel as the printer application, the user may face a disappointment of having to repeat steps that were already taken in the printer application running at the printer.

Accordingly, various embodiments described herein were developed to provide a method and system that enables receipt of printer application state data from an internet-connected printer, and sending of the data to a second computing device with features well-suited for the task, to facilitate efficient editing of the content and subsequent printing of the content. The disclosed embodiments result in integrated printer application functionality across the printer and the second computing device, providing the user with a sense of immediacy and efficiency as to the removed editing function. In certain embodiments, the specific functionality enabled at the second computing device depends upon the recognized capabilities of such device. In certain embodiments, a printer application state is preserved for a stipulated short time such that it can be resumed at the second computing device. In other embodiments, the printer application state may be preserved without a time constraint. In certain embodiments, after editing of the content at the second device, the content is shared with another user by sending the edited content to a second printer that is used by the second user. The disclosed embodiments are likely to lead to a better user experience for users of internet-connected printers and printer applications, and resulting in increased usage of such products.

It should be noted that while the disclosure is discussed frequently with reference to internet-connected printers, the teachings of the present disclosure are not so limited and can be applied to any network-connected printer. As used herein, a "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. "Content" refers to any text, image, or other information that can be received by and stored at computer system for later display, printing, or other presentation to a user. "Printer" or "printing device" refers to any electronic device that prints and includes multifunctional electronic devices that perform additional functions such as scanning and/or copying. "Printer application" refers to a software application that is accessible to a user at a network-connected printer and that enables retrieval of content from computing devices external to the printer. "State of a printer application" refers to a presentation or display of information as presented to a user of a printer application at a network-connected printer. "Editing function" refers to functionality that enables modification of content, e.g., changes to text or images within the content. "Application feature" refers to a characteristic of a software application (e.g., performance, portability, or functionality).

"Application session" refers to a session during which a user or users interacts with a particular software application. The session may be measured in various ways, including but not limited to a passage of a time, a task (e.g., an editing task) being performed, or a type of content being accessed and/or edited via the application. The terms "mobile computing device" and "mobile device" are used synonymously, and refer to any portable computing device capable of communicating with another computing device.

Figure 1:
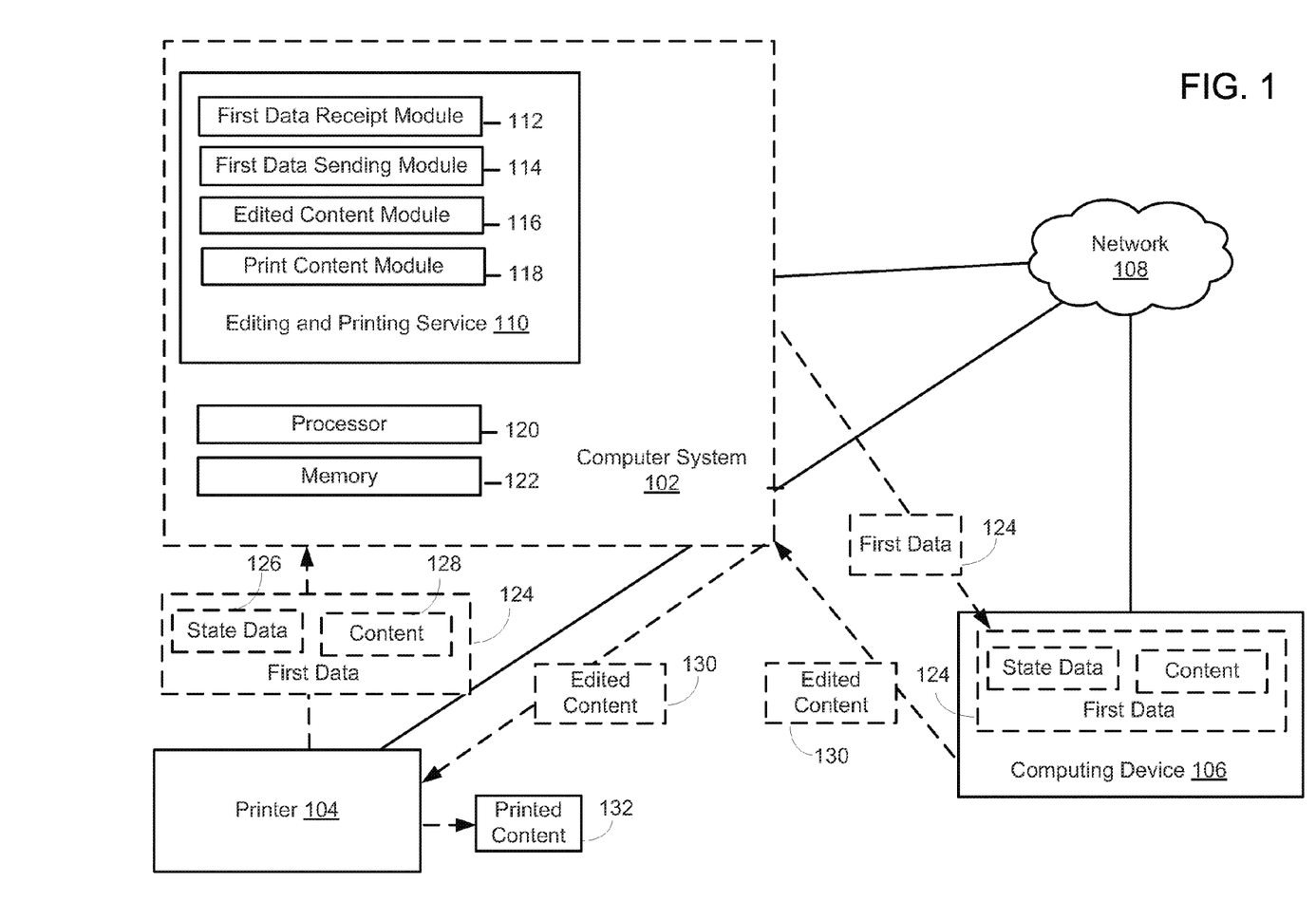
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 1 shows a computer system 102, a printer 104, and a computing device 106 connected to a network 108. Computer system 102 represents generally any computing device or group of computing devices configured to send network requests and content to, and otherwise communicate with printer 104 and computing device 106. In embodiments, computer system 102 may be or include a server, desktop computer, notebook computer, mobile device, tablet computer, and/or any other computing device. Printer 104 represents generally a computing device that is operable to produce printed content, and additionally operable to send network requests and content to, receive network requests and content from, and otherwise communicate with computer system 102 over network 108. Computing device 106 represents generally any computing device or group of computing devices configured to send network requests and content to, and otherwise communicate with computer system 102. In embodiments, computing device 106 may be or include a server, desktop computer, notebook computer, mobile device, tablet computer, and/or any other computing device.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may include, at least in part, an intranet, the internet, or a combination of both. Network 108 may also include intermediate proxies, routers, switches, load balancers, and the like. The paths followed by network 108 between computer system 102, printer 104, and computing device 106 as depicted in FIG. 1 represent the logical communication paths between these devices, not necessarily the physical paths between the devices.

Computer system 102 is shown to include an editing and printing service 110. Editing and printing service 110 represents generally any combination of hardware and programming configured to receive printer application state data from a network-connected printer, to send the data to a second computing device, thereby enabling editing of the content at the second device and printing of the edited content. Editing and printing service 110 includes first data receipt module 112, first data sending module 114, edited content module 116, and print content module 118.

In an example, first data receipt module 112 receives from printer 104 first data 124. First data 124 includes state data 126 that describes a state of a printer application as accessed and viewable by a user at the printer 104, and also includes content 128 to be edited via the printer application.

Figures 2A, 2B:
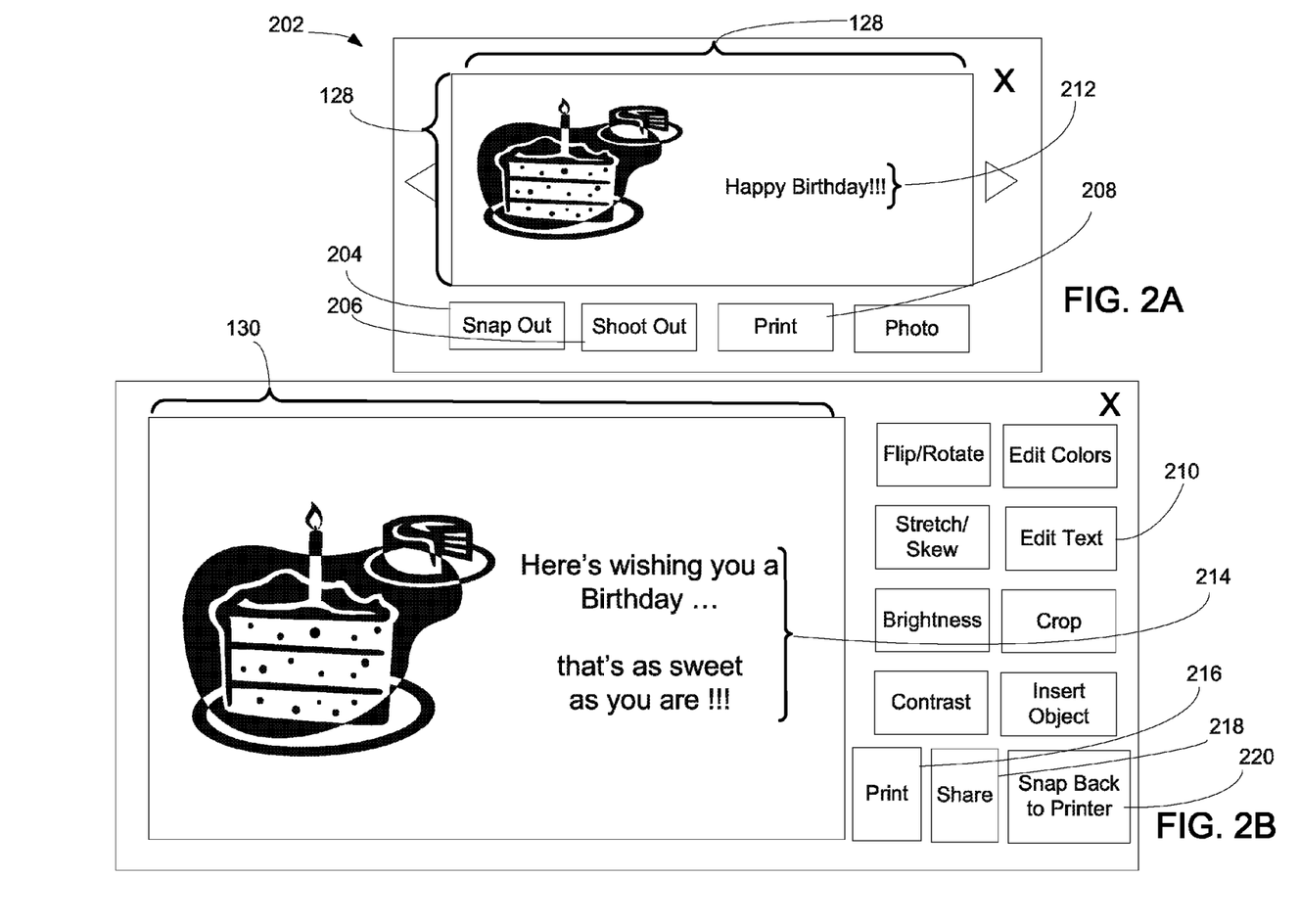
FIG. 2A is an example display illustrating a state of a printer application displayed at a printer, according to various embodiments.
FIG. 2B is an example display illustrating editing of content at a computing device via a received printer application state, according to various embodiments.

FIG. 2A in view of FIG. 1 illustrates as an example a state 202 (FIG. 2A) of a printer application that is displayed to a user at printer 104 via a display device included within printer 104. State 202 (FIG. 2A) includes a view, presentation, or display of content 128. In this example, content 128 is an electronic birthday card that includes an image of a birthday cake and the text "Happy Birthday!!!." State 202 (FIG. 2A) also includes graphic user interface elements that allow a user to interact with the state 202 (FIG. 2A) via a user interface (e.g., via mouseclicks, touch, or other user interactions) to send instructions and directs tasks. In this example, the graphic user interface elements include a "Shoot Out" command button 206 (FIG. 2A) to cause the sending of the content 128 and data describing the state 202 (FIG. 2A) to computer system 102, to be made available to another computing device 106. The graphic user interface elements also include a "Snap Out" command button 204 (FIG. 2A) to cause the sending of the content 128 and state data 126 describing the state 202 (FIG. 2A) to computer system 102, to be made available to another computing device 106 for a predetermined time period.

In this example, the "Snap Out" command is received from a user via user interaction with a graphic user interface button. In another example, the "Snap Out" instruction could be manifested in a user interaction gesture at a GUI (e.g., a specific tapping or swiping motion at a touchscreen) versus a button-click. In yet another example, the command may be received from a user via user interaction with a physical button or a mechanical control at printer 104. State 202 (FIG. 2A) also includes a "print" button 208 (FIG. 2A) to cause printing of the displayed content 128 at printer 104 or at another network connected printer, as directed by a user.

Continuing with the example of FIG. 2A in view of FIG. 1, a user at printer 104 interacts with the "Snap Out" button 204 (FIG. 2A). This interaction causes printer 104 to send first data 124, including state data 126 that is indicative of the state 202 (FIG. 2A) and content 128, to computer system 102 to be received by first data receipt module 112. First data sending module 114, in turn, sends the first data 124 to computing device 106. Computing device 106 is a computing device that is configured to provide a user with access to, and a view of, the content 128 via the received state data. Computing device 106 is additionally configured to enable a user utilizing the application to perform an editing function that was not available at printer 104. As in this example the user selects a "Snap Out" button 204 (FIG. 2A), the ability of the user to access content 128 at computing device 106 expires if the content 128 is not accessed within a predetermined time period after first data 124 (including state data 126 and content 128) is uploaded to computing system 102. For example the time period could be few seconds to few minutes. In this embodiment, had the user chosen the "Shoot Out" button 206 (FIG. 2A) the ability of the user to access content 128 at computing device 106 would not be time constrained. In certain embodiments, computer system 102 modifies the first data 124 received from printer 104, based upon known capabilities of computing device 106, to provide the application features at computing device 106 that were not available at printer 104.

FIG. 2B in view of FIG. 1 illustrates a display, including edited content 130, that is viewable by a user at computing device 106 via a display device incorporated within computing device 106. The display includes a set of graphic user interface buttons to enable a user to edit content. In this example the editing feature options available to a user include "Flip/Rotate", "Edit Colors", "Stretch/Skew", "Edit Text", "Brightness", "Crop", "Contrast", and "Insert Object." These buttons enabled a user at computing device 106 to perform editing functions that were not available to users at printer 104.

In this example, a user selected the "Edit Text" button 210 (FIG. 2B) displayed at computing device 106 to change the "Happy Birthday!!!" text 212 (FIG. 2A) of the content 128 from as it appeared at printer 104 (illustrated at FIG. 2A) to read "Here's wishing you a Birthday . . . . That's as sweet as you are.!!!" 214 (FIG. 2B). Because of the size of the display screen and the user interface options available at printer 104, this editing function was not offered at printer 104 and is instead performed at computing device 106. The editing function is performed via an incidence of the printer application running at, or accessible at, computing device 106 and the received state data 126. In this example, after completion of the editing of content 128 at computing device 106 to form edited content 130, a user at computing device 106 interacts with the "Print" button 216 (FIG. 2B) to cause the edited content 130 to be sent to computing system 102 for forwarding to a network-connected printer.

Returning to FIG. 1, edited content module 116 at computing system 102 receives from computing device 106 edited content 130 that is the result of user editing of the content 128 at computing device 106. Print content module 118 then sends the edited content 130 to printer 104 for printing. Printer 104 in turn performs a printing operation to produce printed content 132.

The functions and operations described with respect to editing and printing service 110 and computer system 102 may be implemented as a computer-readable storage medium containing instructions executed by a processor (e.g., processor 120) and stored in a memory (e.g., memory 122). In a given implementation, processor 120 may represent multiple processors, and memory 122 may represent multiple memories. Processor 120 represents generally any instruction execution system, such as a computer/processor based system or an ASIC (Application Specific Integrated Circuit), a computer, or other system that can fetch or obtain instructions or logic stored in memory 122 and execute the instructions or logic contained therein. Memory 122 represents generally any memory configured to store program instructions and other data.

It should be noted that as the Snap Out" 204 and "Shoot Out" 206 command buttons of state 202 of FIG. 2A do not specifically refer to computing device 106 by name, it can be assumed for the sake of this example that computing device 106 has been preregistered with computer system 102 as a device authorized to receive a transfer of first data 124 from computing device 106 via computer system 102. In another embodiment, however, state 202 may include a graphic user interface that provides a user with an opportunity to specify a computing device which first data 124 is to be sent. In yet another embodiment, state 202 may include a graphic user interface that provide a user with a list of possible computing devices that first data might be sent to, and ask the user to pick from the list.

It should also be noted that while the command buttons of FIG. 2 that cause a sending of first data from a network-connected printer to a computer system are frequently referred to as "Snap Out" or "Shoot Out" buttons, such names are not intended to be restrictive and any other button names could be used. For example, the "Snap Out" button referred to in this disclosure might have been named a "Sending of First Data to a Computing Device to be Available for a Limited time" button, or simply "Button A." Similarly the "Shoot Out" button referred to in this disclosure might just as well have been named "Sending of First Data to a Computing Device to be Available without Time Constraint" button, or simply "Button B." Thus, the "Snap Out" 204 and "Shoot Out" 206 buttons of FIG. 2, the "Snap Back to Printer" button of FIG. 2B, and any other buttons depicted in FIGS. 2A and 2B are examples and are not meant to in any manner limit the claims of this application. In yet other embodiments, the commands and/or steps initiated by these buttons may be initiated by other means, including, but not limited to user interaction gestures not involving GUI buttons or physical buttons.

Figure 3:
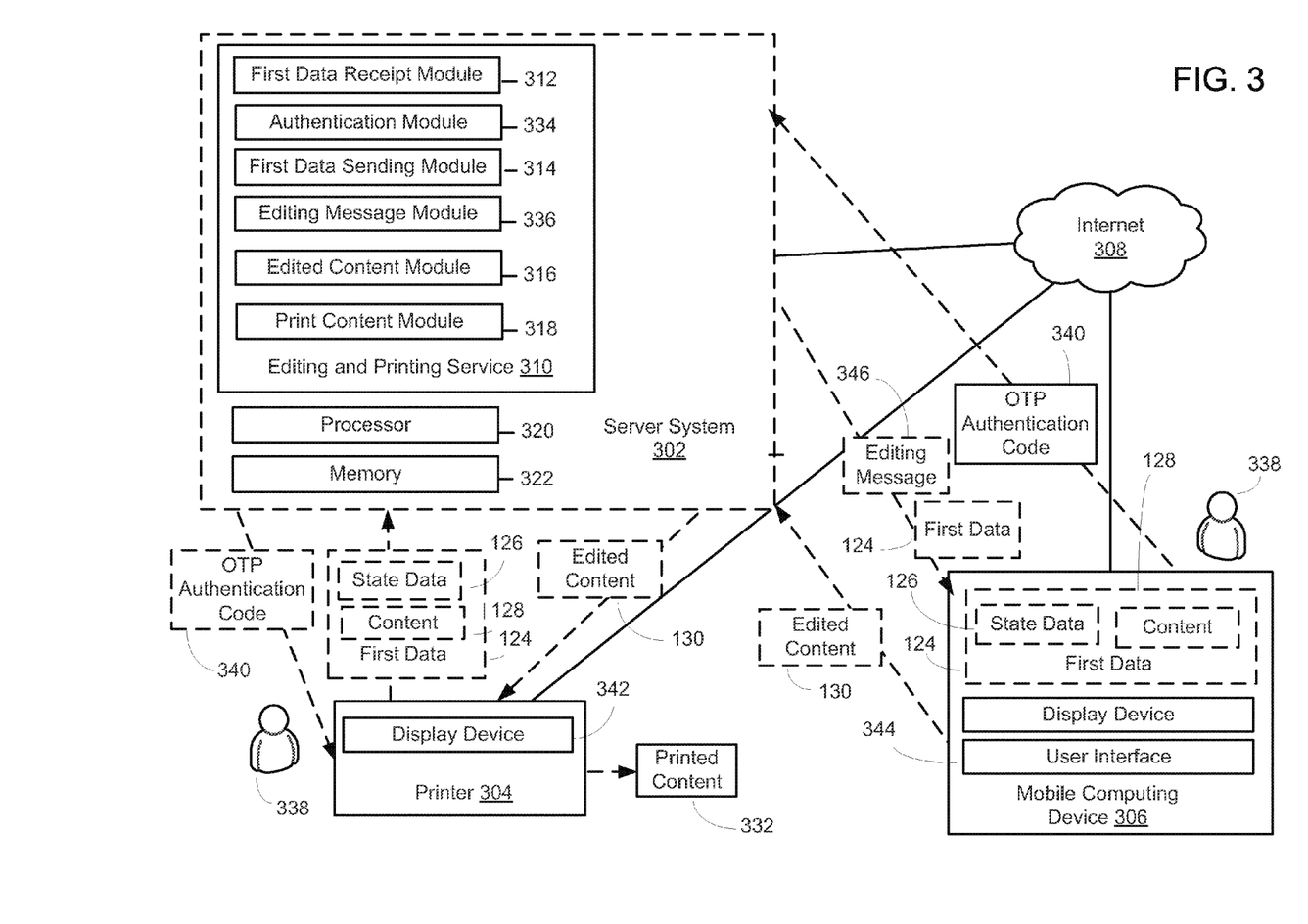
FIG. 3 is a block diagram illustrating a system according to various embodiments.

FIG. 3 is a block diagram that includes a server system 302 according to various embodiments. FIG. 3 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 3 shows a server system 302, a printer 304, and a mobile device 306 connected to an internet 308. Server system 302 represents generally any computing device or group of computing devices configured to of send network requests and content to, and otherwise communicating with printer 304 and mobile device 306. In other embodiments, server system 302 may be or include a computing device other than a server, e.g., a desktop computer, notebook computer, mobile device, tablet computer, and/or any other computing device. Printer 304 represents generally a computing device that is operable to produce printed content, and additionally operable to send network requests and content to, receive network requests and content from, and otherwise communicate with server system 302 over internet 308. Mobile device 306 represents generally any mobile computing device or group of computing devices configured to send network requests and content to, and otherwise communicate with server system 302. In embodiments, mobile device 306 may be or include a notebook computer, tablet computer, smart phone, and/or any other mobile computing device.

Internet 308 represents generally any an internet, the Internet, or an intranet, or some combination of these. The paths followed by internet 308 between server system 302, printer 304, and mobile device 306 as depicted in FIG. 3 represent the logical communication paths between these devices, not necessarily the physical paths between the devices.

Server system 302 is shown to include an editing and printing service 310. Editing and printing service 310 represents generally any combination of hardware and programming configured to receive printer application state data from a network-connected printer, and send the data to a second computing device to enable a user to perform at the second device a content editing function not available at the printer, and to enable printing of the edited content. Editing and printing service 310 includes a first data receipt module 312, authentication module 334, first data sending module 314, editing message module 336, edited content module 316, and print content module 318.

In an example, first data receipt module 312 receives from printer 304 first data 124. First data 124 includes state data 126 that describes a state of a printer application that enables a user 338 to create and print greeting cards, as the application is accessed and viewable by the user 338 at printer 304. Turning to FIG. 2A in view of FIG. 3, the first data 124 also includes greeting card content 128 to be edited via the printer application. In this example, the state data 126 is received at server system 302 a result of user 338 having interacted with the "Shoot Out" graphic user interface button 206 (FIG. 2A) included within the printer application and made accessible to user 338 at printer 304.

The user's interaction with the "Shoot Out" button 206 (FIG. 2A) causes printer 304 to send first data 124, including state data 126 and content 128, to server system 302. In this example of a "Shoot Out" of the state to mobile device 306, the ability of the user to access content 128 at mobile device 306 via an authenticated computing device is not time constrained. Returning to FIG. 3, first data receipt module 312 receives first data 124 and stores the first data 124 in memory such that state data 126 and content 128 are available for download by an authenticated computing device. In an embodiment, the memory location used for storage of first data 124 is a hard drive storage apparatus included within server system 302. In other embodiments, the memory location may include read-only memory (ROM), flash memory, optical disc storage, or other non-volatile storage means. In other embodiments, the memory location may be included within a computing system or device other than server system 302, e.g. included within another computer system that is connected to server system 302 via internet 308.

Authentication module 334 sends a one-time PIN or other one-time authentication code ("OTP") 340 to printer 304. In this example, printer 304 displays the OTP 340 via a touchscreen, display screen, or other display device 342 at printer 304. User 338 views the OTP 340 at printer 304 and then provides the OTP 340 to mobile computing device 306 via user 338 input at mobile device 306 via a keyboard, touchpad, or other user interface device 344 that is part of mobile device 306. Upon receipt of the OTP 340 via the user 338 input, mobile device 306 sends the OTP 340 to server system 302 via internet 308. In other embodiments, the authentication code is not a one-time authentication code and is instead a reusable authentication code. Authentication module 334 receives the OTP 340 from the mobile device 306, and determines that the received OTP 340 matches the OTP 340 that server system 302 sent to printer 304.

After completion of the authentication process described in the preceding paragraph, first data sending module 314 sends the first data 124 to mobile device 306. Editing message module 336 sends an editing message 346 to mobile device 306 indicating that content 128 that was displayed at printer 304 via a printer application state is now available for editing via in that same state at mobile device 306.

User 338 performs an editing function that was not offered at printer 304 upon the content at mobile device 306. In an example, the editing function may include, but is not limited, to adding a handwritten annotation or message to content, attaching personalized photos, attaching personalized voice memos, cropping, adjustment of colors, or redeye correction. The editing function is performed via an incidence of the printer application running at, or accessible at, mobile device 306 and utilizing state data 126 received from printer 304 via server system 302.

In this example, after completion of the editing of content 128 at mobile device 306, user 338 at mobile device 306 interacts with the "Print" button 216 (FIG. 2B) GUI to cause edited content 130 to be sent to server system 302. Edited content module 316 at server system 302 receives edited content 130 from mobile device 306. Print content module 318 then sends the edited content 130 to printer 304 for printing. Printer 304 performs a printing operation to produce printed content 332.

The functions and operations described with respect to editing and printing service 310 and server system 302 may be implemented as a computer-readable storage medium containing instructions executed by a processor (e.g., processor 320) and stored in a memory (e.g., memory 322). In a given implementation, processor 320 may represent multiple processors, and memory 322 may represent multiple memories. Processor 320 represents generally any instruction execution system, such as a computer/processor based system or an ASIC (Application Specific Integrated Circuit), a computer, or other system that can fetch or obtain instructions or logic stored in memory 322 and execute the instructions or logic contained therein. Memory 322 represents generally any memory configured to store program instructions and other data.

Figure 4:
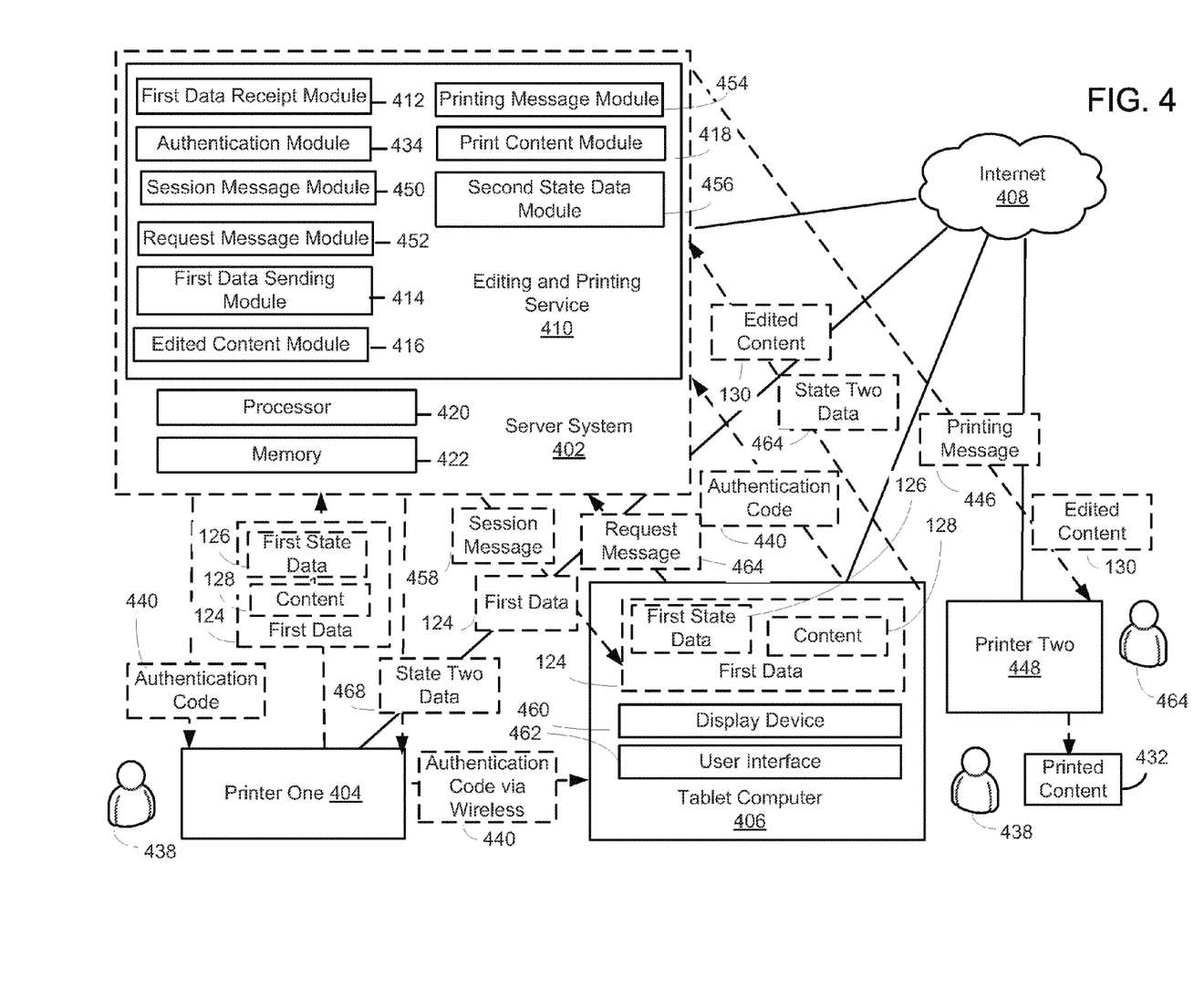
FIG. 4 is a block diagram illustrating a system according to various embodiments.

FIG. 4 is a block diagram that includes a server system 402 according to various embodiments. FIG. 4 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 4 shows a server system 402, a first printer 404, a tablet computer 406, and a second printer 448 connected to an internet 408. Server system 402 represents generally any computing device or group of computing devices configured to of send network requests and content to, and otherwise communicating with first printer 404, tablet computer 406, and second printer 406. In other embodiments, server system 402 may be or include a computing device other than a server, e.g., a desktop computer, notebook computer, mobile device, tablet computer, and/or any other computing device. First printer 404 and second printer 448 represent generally computing devices that are operable to produce printed content, and additionally operable to send network requests and content to, receive network requests and content from, and otherwise communicate with server system 402 over internet 408. Tablet computer 406 represents generally any mobile computing device or group of computing devices configured to send network requests and content to, and otherwise communicate with server system 402. In other embodiments, tablet computer 406 may be or include a notebook computer, smart phone, and/or any other mobile computing device.

Internet 408 represents generally any of an internet, the Internet, or an intranet, or some combination of these. The paths followed by internet 408 between server system 402, first printer 404, tablet computer 406, and second printer 448 as depicted in FIG. 4 represent the logical communication paths between these devices, not necessarily the physical paths between the devices.

Server system 402 is shown to include an editing and printing service 410. Editing and printing service 410 represents generally any combination of hardware and programming configured to receive printer application state data from a network-connected printer, to send the data to a second computing device to enable a user to perform a content editing function not available at the printer, and to enable printing of the edited content. Editing and printing service 410 includes first data receipt module 412, authentication module, session message module 450, request message module 452, first data sending module 414, edited content module 416, printing message module 454, print content module 418, and second state data module 456.

Turning to FIG. 2A in view of FIG. 4, in an example, a user's interaction with either the "Snap Out" 240 button GUI (FIG. 2A) or the "Shoot Out" button 206 (FIG. 2A) GUI causes first printer 404 to send to computer system 402 first data 124, including first state data 126 and content 128. First state data 126 describes a state of a printer application executing at first printer 404 at the time user 438 interacts with the "Snap Out" button or the "Shoot Out" button 206. Content 128 is greeting card content to be edited via the printer application. First data receipt module 412 receives first data 124 such that state data 126 and content 128 are, after the performing of an authentication process, available for download by tablet computer 406.

Authentication module 434 sends a one-time PIN or other one-time authentication code 440 to first printer 404. In this example, first printer 404 is connected to tablet computer 406 via a wireless connection, e.g., a Wi-Fi™ connection, Bluetooth™ connection, or a near-field connection. Printer 404 provides authentication code 440 to tablet computer 406 via this wireless connection. Upon receipt of the authentication code 440 from first printer 404 via the wireless connection, tablet computer 406 sends authentication code 440 to server system 402 via internet 408. In an embodiment, authentication code 440 is a one-time authentication code. Authentication module 434 receives the authentication code 440 from the tablet computer 406 and determines that the received authentication code 440 matches the authentication code that server system 402 sent to first printer 404. In another embodiment, authentication code 440 is not a one-time code. In an embodiment, the authentication code is a code that is reusable for a specific period of time to authorize tablet computer 406 or another computing device as eligible for receipt of first data 124 from server system 402.

After completion of the authentication process described in the preceding paragraph, session message module 450 of server system 402 sends to tablet computer 406, for display to a user via a display device 460, a session message 458 indicating that a printer application session commenced at first printer 404 can be continued at tablet computer 406. The content 128 that was displayed at first printer 404 via the first state is thus now available for editing via in that same first state at tablet computer 406.

A user 438 views the session message 458 at tablet computer 406, and interacts with a user interface 462 at the tablet computer to cause tablet computer 406 to send a request message 464 to server system 402. The request message 464 requests that server system 402 send the first data 124 to tablet computer 406 to enable user 438 to edit the content 128 via the first printer application state. In another embodiment, the request message 464 is sent from tablet computer 406 to server system 402 automatically upon the tablet computer's receipt of session message 458, without any affirmative action on the part of user 438.

Request message module 452 receives request message 464 sent from tablet computer 406. Responsive to the receipt of request message 464, first data sending module 414 sends the first data 124 to tablet computer 406.

User 438 performs upon the content at tablet computer 406 an editing function that was not offered at first printer 404. In the example of FIG. 2B in view of FIG. 4, the editing function is a text editing operation that was not available to user 438 via the printer application as it was executing in the first printer application state at printer 404. The now-available text editing function is performed by user 438 at tablet computer 406 via the printer application state 202 (FIG. 2A) that was sent to server system 402 by printer 404 via server system 410.

After completion of the editing of content 128 at tablet computer 406, user 438 interacts with the "Share" button 218 (FIG. 2B) GUI at tablet computer 406 to cause edited content 130 to be sent to computing system 402. The edited content 130 is sent with an instruction for server system 402 to send the edited content 130 to a second printer 448 for printing. In an example, second printer 448 is a printer accessible to a second user 464 that is a friend or relative of user 438. Edited content module 416 at computing system 402 receives edited content 130 from tablet computer 406 and print content module 418 in turn sends the edited content 130 to second printer 448 for printing to produce printed content 432.

Printing message module 454 sends a message 466 to a network-connected printer via internet 408 indicating that edited content 130 is available for download and printing at second printer 448. In one embodiment, printing message module 454 sends the printing message 446 to printer two 448 before edited content module 416 sends edited content 130 to printer two 448. In another embodiment, printing message module 454 sends the printing message 446 to printer two 448 after edited content module 416 sends edited content 130 to printer two 448. Second printer 448 performs a printing operation to produce printed content 432.

Returning to FIG. 2B in view of FIG. 4, in an embodiment after user 438 completes editing operations at tablet computer 406 and sends edited content 130 to second printer 448, user 464 interacts with a "Snap Back to Printer" button GUI 220 (FIG. 2B) at tablet computer 406 to capture second state data 468 and send the second state data 468 to server system 402. Second state data 468 is data indicative of a state of the printer application at the tablet computer 406 at a time after editing of the content. In an embodiment, the second state data 468 describes the state of the printer application that is in effect when user 438 interacts with the "Snap Back to Printer" button 220 (FIG. 2B). Second state data module 456 receives the second state data 468 the from tablet computer 406, and in turn sends second state data 468 to first printer 404. In this manner, user 438 (or another authorized user) can resume interactions with the printer and the content via the second state data 468 at first printer 404.

It should be noted that the name of the "Snap Back to Printer" command button of FIG. 2B (that when activated causes a sending of second data from tablet computer 406 to printer 404 via server system 402) not intended to be restrictive and any other name could be used. For example, the "Snap Back to Printer" button might have been named "Button C" or any other name. Further, in other embodiments, the commands initiated by these buttons may be initiated by other means, including, but not limited to user interaction gestures not involving GUI buttons or physical buttons.

The functions and operations described with respect to editing and printing service 410 and server system 402 may be implemented as a computer-readable storage medium containing instructions executed by a processor (e.g., processor 420) and stored in a memory (e.g., memory 422). In a given implementation, processor 420 may represent multiple processors, and memory 422 may represent multiple memories. Processor 420 represents generally any instruction execution system, such as a computer/processor based system or an ASIC (Application Specific Integrated Circuit), a computer, or other system that can fetch or obtain instructions or logic stored in memory 422 and execute the instructions or logic contained therein. Memory 422 represents generally any memory configured to store program instructions and other data.

Figure 5:
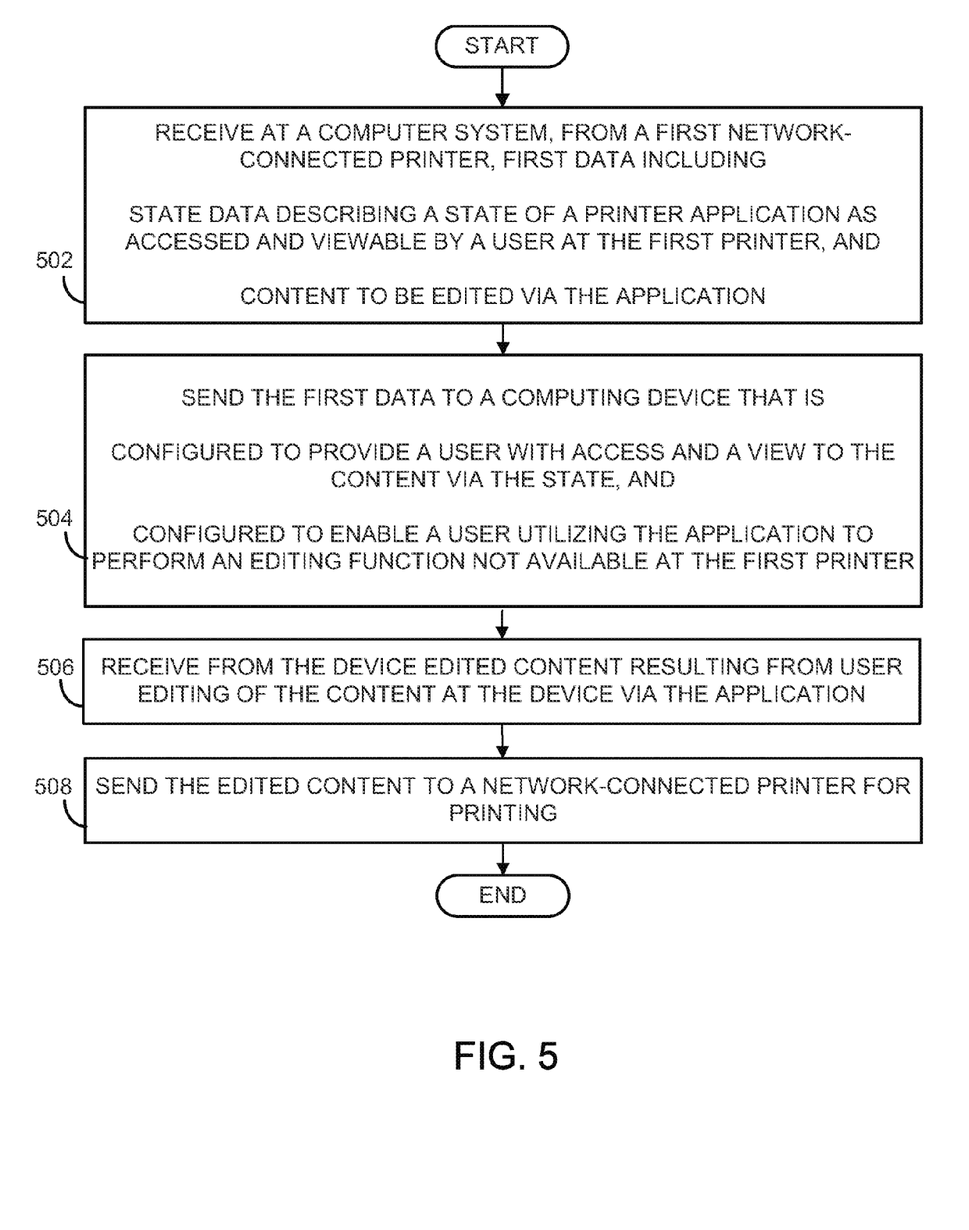
FIG. 5 is a flow diagram depicting steps taken to implement various embodiments.

FIG. 5 is a flow diagram of operation in a system according to various embodiments. In discussing FIG. 5, reference may be made to the diagrams of FIGS. 1, 3, and 4 to provide contextual examples. Implementation, however, is not limited to those examples. Starting with FIG. 5, first data is received at a computer system from a first network-connected printer. The first data includes state data describing a state of a printer application as accessed and viewable by a user at the first printer, and content to be edited via the application (block 502). Referring back to FIGS. 1, 3, and 4, first data receipt module 112, 312, or 412 may be responsible for implementing block 502.

Continuing with the flow diagram of FIG. 5, the first data is sent to a computing device that is configured to provide a user with access and a view to the content via the state. The computing device is further configured to enable a user utilizing the application to perform an editing function not available at the first printer (block 504). Referring back to FIGS. 1, 3, and 4, first data sending module 114, 314, or 414 may be responsible for implementing block 504.

Continuing with the flow diagram of FIG. 5, edited content is received from the device. The edited content is the result of user editing of the content at the device via the application (block 506). Referring back to FIGS. 1, 3, and 4, edited content module 116, 316, or 416 may be responsible for implementing block 506.

Continuing with the flow diagram of FIG. 5, the edited content is sent to a network-connected printer for printing (block 508). Referring back to FIGS. 1, 3, and 4, print content module 118, 318, or 418 may be responsible for implementing block 508.

Although the flow diagram of FIG. 5 shows specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions to enable editing and printing of content, the instructions when executed by a processor causing the processor to:
   receive at a computer system, from a first network-connected printer, first data including state data describing a state of a printer application as accessed by a user at the first network-connected printer and content to be edited via a printer application, wherein the content is viewable on a display of the first network-connected printer;
   send, from the computer system,
      an editing message for display at a computing device to indicate that the content of the first data is available for editing at the computing device, and
      the first data to the computing device to provide the user with access and a view to the content, and to enable a user utilizing an instance of the printer application to perform an editing function not available at the first network-connected printer;
   receive, at the computer system from the computing device, edited content resulting from user editing of the content at the computing device via the printer application; and
   send, from the computer system, the edited content for printing.

2. The medium of claim 1, wherein the state data comprises depiction of a set of graphic user elements that enable interaction with the content.

3. The medium of claim 1, wherein the first data is modified via the printer application being executed at the computing device, based upon capabilities of the computing device, to comprise different application features at the computing device than were available at the first network-connected printer.

4. The medium of claim 3, wherein the different application features available via the printer application being executed at the computing device comprise a second set of graphic user elements different from a set of graphic user elements available at the first network-connected printer.

5. The medium of claim 1, wherein the computing device facilitates access, for a user via the printer application, to the content at the computing device, and wherein access for the user to the content expires responsive to the content not being accessed within a predetermined time period via the printer application at the computing device.

6. The medium of claim 1, wherein sending, by the computer system, the edited content for printing comprises sending, by the computer system, the edited content to the first network-connected printer for printing.

7. The medium of claim 1, wherein sending the edited content for printing comprises sending the edited content to a second network-connected printer different from the first network-connected printer for printing.

8. A server system to enable editing and printing of content, comprising:
   a first data receipt module, to receive, at the server system from a first network-connected printer, first data including state data describing a state of a printer application as accessed by a user at the first network-connected printer and content to be edited via a printer application, wherein the content is viewable on a display of the first network-connected printer;
   an editing message module, to send, from the server system, a message for display at a computing device to indicate that the content of the first data is available for editing at the computing device;
   a first data sending module, to send, from the server system, the first data received from the first network-connected printer to the computing device to provide a user at the computing device with access and a view to the content, and to enable a user at the computing device utilizing another application to perform an editing function not available at the first printer;
   an edited content module, to receive, at the server system from the computing device, edited content resulting from user editing of the content at the computing device via the printer application; and
   a print content module, to send, from the server system, the edited content for printing.

9. The server system of claim 8, further comprising a session message module, to send, from the server system, a message to the computing device indicating an application session that commenced at the first network-connected printer can be continued at the computing device.

10. The server system of claim 8, further comprising a request message module, to receive, at the server system, a message from the computing device requesting the sending of the first data received from the first network-connected printer to the computing device, and wherein the server system sends the first data responsive to receiving the message.

11. The server system of claim 10, wherein the request message is sent from the computing device responsive to receipt of a user request to send the request message.

12. The server system of claim 8, further comprising a printing message module, to send, from the server system, a message to the first network-connected printer indicating that content is available for download and printing.

13. The server system of claim 8, further comprising an authentication module, to send, from the server system, an authentication code to the first network-connected printer; and receive, at the server system, the authentication code from the computing device.

14. The server system of claim 13, wherein the authentication module sends, from the server system, a code to the first network-connected printer for display, and wherein the computing device received the code via user input at the computing device.

15. The server system of claim 13, wherein the code is a one-time code provided to the computing device via wireless communication from the first network-connected printer.

16. The server system of claim 13, wherein the state data comprises depiction of a set of graphic user elements that enable interaction with the content.

17. The server system of claim 8, wherein the state data is first state data and the state is a first state, and further comprising a second state data module, to
  receive, at the server system, from the computing device second state data describing a second state of the printer application occurring at a time after editing of the content, and
  send, from the server system, the second state data to the first network-connected printer.

18. A method for editing and printing of content, the method implemented in a system comprising a server computing system and a set of network-connected printers, the method comprising:
  transmitting, by a first network-connected printer of the set of network-connected printers, first data to the server computing system, wherein the first data comprises content to be edited via a printer application and state data describing a state of the printer application, wherein the content is viewable by a user on a display of the first network-connected printer;
  receiving, by the server computing system, the first data from the first network-connected printer;
  sending, by the server computing system,
    an editing message for display at a user computing device to indicate that the content of the first data is available for editing at the user computing device, and
    the first data to the user computing device, wherein the user computing device comprises an instance of the printer application and wherein the user computing device is to provide a user at the user computing device with access and a view to the content of the first data, and facilitate performance of an editing function via another printer application that is not available at the first network-connected printer;
  receiving, at the server computing system from the user computing device, edited content resulting from user editing of the content at the user computing device via the printer application; and
  sending, from the server computing system, the edited content for printing.

19. The method of claim 18, further comprising:
  receiving, by the server computing system from a second network-connected printer of the set of network connected-printers, second data, wherein the second data comprises second content to be edited via the printer application and second state data describing a second state of the printer application as accessed and viewable by a user at the second network-connected printer;
  sending, by the server computing system, the second data to a second user computing device, wherein the second user computing device comprises a second instance of the printer application and wherein the second user computing device is to provide the user with access and a view to the second content of the second data, and facilitate performance of a second editing function via the printer application that is not available at the second network-connected printer;
  receiving, at the server computing system from the second user computing device, second edited content resulting from user editing of the second content at the second user computing device via the printer application; and
  sending, from the server computing system, the second edited content for printing.

* * * * *